(12) United States Patent
Yamamoto et al.

(10) Patent No.: US 11,186,699 B2
(45) Date of Patent: Nov. 30, 2021

(54) CALCIUM CARBONATE FILLER FOR RESINS, AND RESIN COMPOSITION CONTAINING SAME

(71) Applicant: Maruo Calcium Co., Ltd., Akashi (JP)

(72) Inventors: Kazuya Yamamoto, Akashi (JP); Hidemitsu Kasahara, Akashi (JP)

(73) Assignee: MARUO CALCIUM CO., LTD., Hyogo (JP)

( * ) Notice: Subject to any disclaimer, the term of this patent is extended or adjusted under 35 U.S.C. 154(b) by 201 days.

(21) Appl. No.: 16/348,625

(22) PCT Filed: Sep. 7, 2017

(86) PCT No.: PCT/JP2017/032195
§ 371 (c)(1),
(2) Date: May 9, 2019

(87) PCT Pub. No.: WO2018/088008
PCT Pub. Date: May 17, 2018

(65) Prior Publication Data
US 2019/0352485 A1 Nov. 21, 2019

(30) Foreign Application Priority Data

Nov. 10, 2016 (JP) .............................. JP2016-219422

(51) Int. Cl.
| | |
|---|---|
| *C08K 3/26* | (2006.01) |
| *C09C 1/02* | (2006.01) |
| *C01F 11/18* | (2006.01) |
| *C08K 9/04* | (2006.01) |
| *C08L 23/00* | (2006.01) |
| *C08L 67/00* | (2006.01) |
| *C08L 81/04* | (2006.01) |

(52) U.S. Cl.
CPC .............. *C08K 3/26* (2013.01); *C01F 11/18* (2013.01); *C01F 11/185* (2013.01); *C08K 9/04* (2013.01); *C09C 1/021* (2013.01); *C01P 2004/51* (2013.01); *C01P 2004/62* (2013.01); *C01P 2006/12* (2013.01); *C01P 2006/37* (2013.01); *C01P 2006/90* (2013.01); *C08K 2003/265* (2013.01); *C08K 2201/003* (2013.01); *C08K 2201/005* (2013.01); *C08K 2201/006* (2013.01); *C08L 23/00* (2013.01); *C08L 67/00* (2013.01); *C08L 81/04* (2013.01)

(58) Field of Classification Search
CPC ............................... C01F 11/185; C09C 1/021
See application file for complete search history.

(56) References Cited

U.S. PATENT DOCUMENTS

| | | | |
|---|---|---|---|
| 5,000,871 A | 3/1991 | Minayoshi | |
| 7,977,410 B2 * | 7/2011 | Nagamatsu | ............. C01F 11/18 523/205 |
| 9,926,428 B2 * | 3/2018 | Sako | ........................ C08K 9/04 |
| 2010/0068506 A1 | 3/2010 | Shimono | |
| 2014/0366777 A1 | 12/2014 | Skrzypezak | |
| 2015/0183963 A1 | 7/2015 | Maeba | |
| 2015/0240040 A1 * | 8/2015 | Kasahara | ................ C01F 11/18 524/425 |

FOREIGN PATENT DOCUMENTS

| | | | | |
|---|---|---|---|---|
| JP | S62-263238 A | 11/1987 | | |
| JP | 64-4240 A | 1/1989 | | |
| JP | H05-117443 A | 5/1993 | | |
| JP | H10-101844 A | 4/1998 | | |
| JP | 2001-072890 A | 3/2001 | | |
| JP | 2008-156204 A | 7/2008 | | |
| JP | 2013-060692 A | 4/2013 | | |
| JP | 2013-203851 A | 10/2013 | | |
| JP | 2014-019605 A | 2/2014 | | |
| JP | 2014-524876 A | 9/2014 | | |
| WO | WO-2015129560 A1 * | 9/2015 | ............... C08K 9/04 | |

OTHER PUBLICATIONS

Fukushima, "Specific Surface Area of Powders by Permeametry", Shikizai, 44, 1971, pp. 382-387.

* cited by examiner

*Primary Examiner* — Brieann R Johnston
(74) *Attorney, Agent, or Firm* — Pearne & Gordon LLP

(57) ABSTRACT

Provided is a calcium carbonate filler for resins that has uniform particles, high dispersibility and thermal stability, and, in particular, excellent smoothness, peelability, resistance to detachment, and the like and is useful as an antiblocking material. The calcium carbonate filler for resins includes calcium carbonate particles and satisfies formulae (a) to (e) below: (a) $1.0 \leq Sw \leq 12.0$ (m$^2$/g); (b) $0.1 \leq Dx \leq 5.0$ (μm); (c) $0.1 \leq Dy \leq 5.0$ (μm); (d) $0.8 \leq Dy/Dx \leq 3.5$; and (e) $0.1 \leq Tw \leq 0.8$ (% by weight), where Sw is a BET specific surface area (m$^2$/g); Dx is a primary particle diameter (μm) expressed as a calculation formula: $Dx = 6/(2.7 \cdot Sw)$; Dy is a 50% diameter (μm); and Tw is a thermal weight loss (% by weight) between 100 and 300° C.

6 Claims, No Drawings

CALCIUM CARBONATE FILLER FOR RESINS, AND RESIN COMPOSITION CONTAINING SAME

TECHNICAL FIELD

The present invention relates to a calcium carbonate filler for resins and a resin composition containing the same, and more particularly relates to a calcium carbonate filler for resins that is adjusted so as to have a particular specific surface area, particular particle size characteristics, and a particular thermal weight loss and thus has uniform particles and high dispersibility and thermal stability, and to a resin composition to which the calcium carbonate filler is added.

The calcium carbonate filler for resins of the present invention is useful as an antiblocking material that has excellent slip properties and resistance to detachment, for use in resin films in which the calcium carbonate filler is added to, for example, general purpose plastics such as polyethylene and polypropylene; polyesters such as polylactic acid (PLA), polycarbonate (PC), and polyethylene terephthalate (PET); engineering plastics that are processed at high temperatures, such as polyphenylene sulfide (PPS); and the like, and not to mention for use in conventional sealants, flooring, and adhesives to which the calcium carbonate filler is added at high concentrations.

BACKGROUND ART

Conventionally, in order to realize functions of synthetic resin films for food packaging, for industrial use (for optical use and for magnetic recording), and the like, antiblocking materials are widely used for the purpose of preventing adhesion between films using inorganic particles of silica, titanium oxide, calcium carbonate, or the like or organic particles of polystyrene, polyacrylate, or the like.

For example, in Patent Document 1, a glycol-based dispersion of calcium carbonate obtained by suspending a synthetic calcium carbonate having a particular particle size, the synthetic calcium carbonate being obtained through a wet reaction of a calcium hydroxide with carbon dioxide gas, in ethylene glycol (EG) and finely dispersing the synthetic calcium hydroxide into a particular particle size using a wet grinder is made into a polyethylene terephthalate (PET) film prepared through polymerization with terephthalic acid or dimethyl terephthalic acid and film formation, and has excellent antiblocking performance.

Moreover, in Patent Document 2, in a carbonation reaction of a water-soluble calcium with a water-soluble carbonate in an aqueous solution system, or in a carbon dioxide gas reaction in a system in which quicklime is digested (converted to calcium hydroxide) in a mixed solvent of methanol and water, a uniform vaterite-type calcium carbonate or a calcite-type calcium carbonate is prepared, and excellent antiblocking performance is achieved.

RELATED ART DOCUMENTS

Patent Documents

[Patent Document 1] Japanese Laid-Open Patent Publication No. S64-4240

[Patent Document 2] Japanese Laid-Open Patent Publication No. H5-117443

SUMMARY OF THE INVENTION

Problem to be Solved by the Invention

However, recent years has seen significant improvements in the surface smoothness of synthetic resin films, and, for example, with respect to resin films for molding ceramic sheets of laminated ceramic capacitors, a further reduction in thickness of a ceramic sheet layer has been in demand for the purposes of achieving a smaller size and a higher capacity. The thickness of such ceramic sheet layers has been reduced from conventional thicknesses of about 7 to 10 μm to current thicknesses of about 3 to 5 μm, and furthermore, to thicknesses of about 1 to 2 μm, and even to thicknesses of less than 1 μm.

Therefore, needless to say, particle uniformity and dispersibility of an antiblocking material that is used need to be improved. Also, in order to prevent detachment of particles and a decrease in antiblocking properties, which are caused by voids generated in resin films, adhesion (resistance to detachment) of the antiblocking material to (from) resin films needs to be improved upon, and there is a demand for particles whose thermal stability, which is one factor involved in void generation, is high.

To address the above-described problems, the inventors of the present invention have conducted in-depth research and found that a calcium carbonate filler that is adjusted so as to have a particular BET specific surface area, particular particle size characteristics, and a particular thermal weight loss and that has high thermal stability can exhibit antiblocking properties that are effective for the smoothness of resin films, and thus reached the present invention.

Means for Solving the Problem

In order to achieve the above-described object, a feature of the present invention is a calcium carbonate filler for resins, the calcium carbonate filler including calcium carbonate particles and satisfying formulae (a) to (e) below:

$$1.0 \leq Sw \leq 12.0 \ (m^2/g); \tag{a}$$

$$0.1 \leq Dx \leq 5.0 \ (\mu m); \tag{b}$$

$$0.1 \leq Dy \leq 5.0 \ (\mu m); \tag{c}$$

$$0.8 \leq Dy/Dx \leq 3.5; \text{ and} \tag{d}$$

$$0.1 \leq Tw \leq 0.8 \ (\% \text{ by weight}), \tag{e}$$

where

Sw is a BET specific surface area ($m^2/g$) as measured using a BET specific surface area measuring apparatus;

Dx is a primary particle diameter (μm) calculated based on the BET specific surface area Sw and expressed as a calculation formula: $Dx = 6/(2.7 \cdot Sw)$;

Dy is a 50% diameter (μm) when particles are arranged in ascending order of volume in a cumulative particle size volume distribution that is actually measured using a laser diffraction particle size distribution measuring apparatus; and Tw is a thermal weight loss (% by weight) between 100 and 300° C. as measured using a differential thermal analysis balance apparatus.

Another feature of the present invention is the above-described calcium carbonate filler for resins, wherein a coating layer composed of a surface treatment agent is formed on surfaces of the calcium carbonate particles.

Another feature of the present invention is the above-described calcium carbonate filler for resins, wherein the surface treatment agent is a compound having the ability to chelate alkaline-earth metals and/or a surfactant.

Another feature of the present invention is a resin composition including a resin and the above-described calcium carbonate filler for resins.

Another feature of the present invention is the above-described resin composition, wherein the resin is a film-forming synthetic resin.

Another feature of the present invention is the above-described resin composition, wherein the film-forming synthetic resin is selected from polyester, polyphenylene sulfide, and polyolefin.

Another feature of the present invention is the above-described resin composition, wherein the calcium carbonate filler for resins is for use as an antiblocking material.

Effects of the Invention

The calcium carbonate filler for resins of the present invention is composed of calcium carbonate particles that are adjusted so as to have a particular specific surface area, particular particle size characteristics, and a particular thermal weight loss and that are uniform and have high dispersibility and thermal stability, exhibits excellent resin film slip properties and affinity even when added to a synthetic resin film or the like that is processed at a high temperature, and is highly effective in suppressing detachment of particles. Therefore, the calcium carbonate filler for resins of the present invention is useful especially as an antiblocking material for resin films.

DESCRIPTION OF EMBODIMENTS

It is necessary that the calcium carbonate filler for resins (hereinafter referred to simply as the calcium carbonate filler) of the present invention is composed of calcium carbonate particles and satisfies formulae (a) to (e) below:

$$1.0 \leq Sw \leq 12.0 \ (m^2/g); \quad (a)$$

$$0.1 \leq Dx \leq 5.0 \ (\mu m); \quad (b)$$

$$0.1 \leq Dy \leq 5.0 \ (\mu m); \quad (c)$$

$$0.8 \leq Dy/Dx \leq 3.5; \text{ and} \quad (d)$$

$$0.1 \leq Tw \leq 0.8 \ (\% \text{ by weight}), \quad (e)$$

where

Sw is a BET specific surface area ($m^2/g$) as measured using a BET specific surface area measuring apparatus;

Dx is a primary particle diameter ($\mu m$) calculated based on the BET specific surface area Sw and expressed as a calculation formula: $Dx=6/(2.7 \cdot Sw)$;

Dy is a 50% diameter ($\mu m$) when particles are arranged in ascending order of volume in a cumulative particle size volume distribution that is actually measured using a laser diffraction particle size distribution measuring apparatus; and Tw is a thermal weight loss (% by weight) between 100 and 300° C. as measured using a differential thermal analysis balance apparatus.

The formula (a) of the present invention expresses the size of individual particles of the calcium carbonate filler as a BET specific surface area (Sw), and Sw is required to be 1.0 to 12.0 $m^2/g$. In general, in the case of a calcium carbonate for use as an antiblocking material for resins, particles having a relatively small particle diameter and having higher dispersibility are used, and accordingly, the BET specific surface area also tends to be large. However, since an excessively high BET specific surface area value causes aggregation, a range of 1.0 to 12.0 $m^2/g$ is appropriate. If Sw is more than 12.0 $m^2/g$, a problem arises in that calcium carbonate primary particles are small and are likely to aggregate. Moreover, in the case where the calcium carbonate filler is used as an antiblocking material for a resin film, a large amount of calcium carbonate needs to be added in order to obtain appropriate antiblocking properties, and thus, for example, a problem arises in that a volatile component contained in the calcium carbonate deteriorates the resin. On the other hand, if Sw is less than 1.0 $m^2/g$, the primary particles are excessively large, and thus, problems arise in that coarse particles are produced, detachment of particles from the resin film occurs, and appropriate antiblocking properties cannot be obtained. Therefore, Sw is more preferably 1.5 to 10.0 $m^2/g$, and even more preferably 2.0 to 8.0 $m^2/g$.

Note that a Macsorb manufactured by Mountech Co., Ltd. was used as the BET specific surface area measuring apparatus, and measurement was performed using the following method.

<Method for Measuring BET Specific Surface Area (Sw)>

The specific surface area was measured by setting 0.2 to 0.3 g of a calcium carbonate filler in the measuring apparatus, performing, as a pretreatment, heat treatment in a mixed gas atmosphere of nitrogen and helium at 200° C. for 5 minutes, and then performing low-temperature and low-humidity physical adsorption in a liquid nitrogen environment.

The formula (b) of the present invention expresses an equivalent sphere primary particle diameter (Dx) that is expressed as the Kozeny-Carman equation, $Dx=6/$true specific gravity$\cdot Sw$, and theoretically obtained based on the true specific gravity, 2.7, of calcium carbonate and the BET specific surface area (Sw) of calcium carbonate, and Dx is required to be 0.1 to 5.0 $\mu m$. In general, in the case of a calcium carbonate filler for use as an antiblocking material for resins, if Dx is less than 0.1 $\mu m$, primary particles strongly aggregate, and accordingly, the cohesive force between particles is strong, which is inappropriate in terms of dispersibility. On the other hand, if Dx is more than 5.0 $\mu m$, as described above, problems arise in that coarse particles are produced, and detachment of particles from a film occurs, and thus, appropriate antiblocking properties cannot be obtained. Therefore, Dx is preferably 0.2 to 4.0 $\mu m$, and more preferably 0.3 to 3.0 $\mu m$.

With regard to the formula (c) of the present invention, the 50% diameter (Dy) when particles are arranged in ascending order of volume in a cumulative particle size volume distribution that is actually measured using a laser diffraction particle size distribution measuring apparatus is actually measured, and Dy is required to be 0.1 to 5.0 $\mu m$. If Dy is less than 0.1 $\mu m$, the cohesive force between primary particles is strong, which is inappropriate for an antiblocking material. On the other hand, if Dy is more than 5.0 $\mu m$, problems arise in that coarse particles are produced, and detachment of particles from the resin film occurs, and thus, a problem arises in that appropriate antiblocking properties cannot be obtained. Therefore, Dy is preferably 0.2 to 4.0 $\mu m$, and more preferably 0.3 to 3.0 $\mu m$.

As the particles expressed by the above-described Dx and Dy, two or more types of particles that have different particle diameters within a range of 0.1 to 5.0 $\mu m$ may be used in combination.

Note that a Microtrac MT-3300EX II manufactured by Nikkiso Co., Ltd. was used as the laser diffraction particle size distribution measuring apparatus, and the 50% diameter was measured using the following method.

<Method for Measuring 50% Diameter (Dy)>

Methanol was used as a medium. As a pretreatment, 0.1 to 0.3 g of a calcium carbonate filler, and 50 ml of the methanol solvent were added to a beaker (100 ml) to form a suspension, and preliminary dispersion was performed under certain conditions of 300 μA for one minute using a chip-type ultrasonic disperser (US-300T manufactured by Nihonseiki Kaisha Ltd.). After that, the measurement was performed.

The formula (d) of the present invention expresses the above-described Dy (actually measured diameter) divided by Dx (theoretical diameter), and Dy/Dx is required to be within a range of 0.8 to 3.5. In general, in the case of a calcium carbonate for use as an antiblocking material for resins, the dispersibility of the calcium carbonate in a resin film is likely to be affected when the value of the actually measured diameter Dy and the value of the theoretical diameter Dx are close to each other. If Dy/Dx is less than 0.8, the actually measured diameter is smaller than the theoretical diameter, and thus, such a particle characteristic means clusters of aggregated particles and is inappropriate for an antiblocking material. On the other hand, if Dy/Dx is more than 3.5, there is a problem with particle uniformity, and such a particle characteristic is inappropriate for an antiblocking material. Therefore, Dy/Dx is more preferably 0.8 to 3.0, and even more preferably 0.8 to 2.5.

The formula (e) of the present invention expresses the thermal weight loss (Tw) between 100 and 300° C. as measured using the differential thermal analysis balance apparatus, and Tw is required to be 0.1 to 0.8% by weight. In general, in the case of a calcium carbonate for use as an antiblocking material for resins, an excessively high thermal weight loss incurs the problem of, during kneading the calcium carbonate and a resin together or during forming the kneaded product into a film, a volatile component, such as water, in the calcium carbonate and the resin reacting with each other, causing yellowing deterioration, and the formation of cavities or voids, which leads to detachment of particles themselves. Therefore, if Tw is more than 0.8% by weight, there is a problem in that the volatile component attacks the resin during the kneading with the resin or during the film formation, and thus induces resin deterioration, or gas mark generation during the film formation. On the other hand, if Tw is less than 0.1% by weight, even though there are no particular problems in terms of properties, a high production load is required in order to increase the crystallinity of the calcium carbonate. Therefore, Tw is more preferably 0.1 to 0.6% by weight, and even more preferably 0.1 to 0.5% by weight.

Note that a DTG-60A manufactured by Shimadzu Corporation was used as the differential thermal analysis balance apparatus, and measurement was performed using the following method.

<Method for Measuring Thermal Weight Loss (Tw)>

Thirty milligrams of a calcium carbonate filler was weighed on a platinum pan having a diameter of 5 mm and set in the differential thermal analysis balance apparatus. The temperature was increased at a temperature increasing rate of 30° C./min, and the thermal weight loss between 100 and 300° C. was measured.

With regard to the calcium carbonate that is used in the present invention, taking the dispersibility of the calcium carbonate, or foreign matter into account, it is preferable to use a calcium carbonate prepared using a synthesis method in which a naturally-occurring grey dense limestone is calcined, rather than a calcium carbonate prepared from a naturally-occurring white saccharoidal limestone (heavy calcium carbonate), which contains large amounts of fine particles and impurities, using a grinding method. The reason for this is that, in the case of a synthetic product (light and colloidal calcium carbonate) that is prepared using a synthesis method, particles can be controlled so as to be uniform, and ore, which is hydrochloric acid insoluble matter that forms relatively coarse particles, can be removed. Moreover, although three crystal forms of the synthetic product, a vaterite crystal, which is the least stable in aqueous solvents or thermodynamically, an aragonite crystal, which is metastable, and a calcite crystal, which is stable, can be given as examples, the calcite crystal is preferred in terms of thermal stability and the like.

To prepare calcium carbonate particles, either of the following methods can be used: a method in which a naturally-occurring calcium carbonate is ground and classified, and a method in which a calcium carbonate is synthesized and processed. The method in which a calcium carbonate is synthesized is, in general, a carbon dioxide gas method in which milk of lime that has been obtained by adding water to quicklime obtained through calcination of limestone is caused to react with carbon dioxide gas emitted during the calcination by causing the carbon dioxide gas to flow therethrough. Particles in an aqueous slurry of calcium carbonate obtained through the reaction of the carbon dioxide gas method can be adjusted so as to have a desired BET specific surface area or particle diameter using an Ostwald ripening method or the like. For the purposes and uses of the present invention, the uniformity and dispersibility of particles are important, and therefore, it can be said that a technique of finely adjusting the particle diameter to a desired range using the synthesis method is preferred to the method in which a naturally-occurring calcium carbonate is ground and classified.

The calcium carbonate filler of the present invention can be surface-treated (coated) with various types of surface treatment agents in order to improve powder dispersibility, alkali resistance, and compatibility with a resin and to improve the characteristics of the calcium carbonate filler.

Although there is no particular limitation on the surface treatment agents, either a compound that has the ability to chelate alkaline-earth metals (A) (hereinafter also referred to as "chelating compound (A)") for improving the dispersibility of the calcium carbonate filler or a surfactant (B) for improving the alkali resistance or improving the stability and compatibility with a resin, or both can be used.

Examples of the chelating compound (A) include aminocarboxylic acid-based chelating agents typified by ehylenediaminetetraacetic acid, nitrilotriacetic acid, hydroxyethylethylenediaminetriacetic acid, diethylenetriaminepentaacetic acid, triethylenetetraaminehexaacetic acid, and the like; organophosphorous compounds, such as hydroxyethylidene diphosphorous acid and nitrotris methylenephosphonic acid; water treatment agents composed of an aluminum compound such as polyaluminum chloride; polyvalent carboxylic acids typified by polyacrylic acid, polymaleic acid, polyitaconic acid, and polycrotonic acid, their salts, and copolymers thereof; inorganic phosphorous compounds typified by polyphosphoric acids such as condensed phosphoric acids, such as hexametaphosphoric acid and pyrophosphoric acid, and their salts; and the like. These chelating compounds may be used alone, or may be used in a combination of two or more if necessary.

Among the above-described chelating compounds (A), in light of the affinity to and the dispersibility in resins, of an antiblocking material for synthetic resins, which is an intended use of the present invention, condensed phosphoric acid compounds and polyvalent carboxylic acid compounds are particularly preferable, and in particular, polyacrylate compounds are the most preferable.

Moreover, although the amount of the above-described chelating compound (A) that is used varies depending on the specific surface area of the calcium carbonate, the resin that is used, and the amount of resin that is added, and is therefore difficult to specify unconditionally, it is usually preferable that the chelating compound (A) is used in an amount of 0.03 to 3% by weight with respect to the calcium carbonate's BET specific surface area Sw/10. If the amount of the chelating compound (A) that is used is less than 0.03% by weight, a sufficient dispersion effect is unlikely to be obtained, but even if the chelating compound (A) is added in an amount of more than 3% by weight, the effect is unlikely to be further improved. Therefore, the amount of the chelating compound (A) that is used is more preferably 0.05 to 2.5% by weight and even more preferably 0.1 to 2.0% by weight.

Examples of the surfactant (B) that can be used in the present invention include saturated fatty acids, unsaturated fatty acids, alicyclic carboxylic acids, resin acids, and their salts or esters; phosphoric acid esters, alcoholic surfactants, sorbitan fatty acid esters, amide-based and amine-based surfactants, polyoxyalkylene alkyl ethers, polyoxyethylene nonylphenyl ethers, sodium alpha olefin sulfonate, long-chain alkyl amino acids, amine oxides, alkyl amines, quaternary ammonium salts, coupling agents and oils, and the like, and these surfactants may be used alone, or may be used in a combination of two or more if necessary.

Examples of the saturated fatty acids include capric acid, lauric acid, myristic acid, palmitic acid, stearic acid, and the like. Examples of the unsaturated fatty acids include oleic acid, linoleic acid, linolenic acid, and the like. Examples of the alicyclic carboxylic acids include naphthenic acids having a carboxyl group at a terminal of a cyclopentane ring or a cyclohexane ring, and the like. Examples of the resin acids include abietic acid, pimaric acid, neoabietic acid, and the like.

Examples of the phosphoric acid esters include orthophosphoric acid esters whose functional groups are typified by a trimethyl group, a triethyl group, a tributyl group, a triphenyl group, and the like, acidic phosphoric acid esters whose functional groups are typified by a methyl group, an ethyl group, a butyl group, an ethylhexyl group, an isodecyl group, and the like, phosphite-based phosphorous acid esters, and the like.

Examples of the alcoholic surfactants include sodium alkyl sulfate, sodium alkylether sulfate, and the like. Examples of the sorbitan fatty acid esters include sorbitan monolaurate, polyoxyethylene sorbitan monostearate, and the like. Examples of the amide-based and amine-based surfactants include fatty acid alkanolamides, polyoxyethylene fatty acid amides, and the like. Examples of the polyoxyalkylene alkyl ethers include polyoxyethylene alkyl ethers, polyoxyethylene lauryl ethers, and the like. Examples of betaine-based surfactants include lauryl betaines, stearyl betaines, and the like.

Examples of the amine oxides include alkyl amine oxides and the like. Examples of the alkyl amine salts include stearyl amine acetate and the like. Examples of the quaternary ammonium salts include stearyl trimethyl ammonium chloride, quaternary ammonium sulfate, and the like.

Examples of the coupling agents and oils include silane coupling agents typified by vinyltrimethoxysilane, N-2-(aminoethyl)-3-aminopropyltrimethoxysilane, and the like; titanate coupling agents typified by isopropyl triisostearoyl titanate; silicone-based oils typified by methyl hydrogen; and the like.

Examples of the salts of the above-described various types of acids include salts of alkali metals such as potassium and sodium, and specific examples thereof include saturated fatty acid salts such as potassium laurate, potassium myristate, potassium palmitate, sodium palmitate, potassium stearate, and sodium stearate; unsaturated fatty acid salts such as potassium oleate and sodium oleate; alicyclic carboxylic acid salts such as lead naphthenate and lead cyclohexyl butyrate; and potassium abietate and sodium abietate.

Moreover, examples of the esters of the above-described various types of acids include saturated fatty acid esters such as ethyl caproate, vinyl caproate, diisopropyl adipate, ethyl caprylate, allyl caprate, ethyl caprate, vinyl caprate, diethyl sebacate, diisopropyl sebacate, cetyl isooctanoate, octyldodecyl dimethyloctanoate, methyl laurate, butyl laurate, lauryl laurate, methyl myristate, isopropyl myristate, cetyl myristate, myristyl myristate, isocetyl myristate, octyldodecyl myristate, isotridecyl myristate, metyl palmitate, isopropyl palmitate, octyl palmitate, cetyl palmitate, isostearyl palmitate, methyl stearate, butyl stearate, octyl stearate, stearyl stearate, cholesteryl stearate, isocetyl isostearate, methyl behenate, and behenyl behenate; and unsaturated fatty acid esters such as methyl oleate, ethyl linoleate, isopropyl linoleate, ethyl olivate, and methyl erucate, and also include heat-resistant special fatty acid esters, such as higher alcohol esters of long-chain fatty acids, neopentyl polyol (including long-chain and medium-chain) fatty acid-based ester and partial ester compounds, dipentaerythritol long-chain fatty acid esters, complex medium-chain fatty acid esters, 12-isocetyl stearoyl stearate, 12-isostearyl stearoyl stearate, 12-stearyl stearoyl stearate, octyl esters of beef tallow fatty acids, and fatty acid esters of polyhydric alcohol fatty acid alkyl glyceryl ethers; and aromatic esters typified by benzoic acid esters.

With respect to these surfactants (B), from the standpoint of improving the stability and compatibility with resins when used as an antiblocking material for synthetic resins, phosphorus-based surfactants, in particular, have favorable affinity to the calcium carbonate, and trimethyl phosphate, triethyl phosphate, methyl acid phosphate, and ethyl acid phosphate, which have a relatively high phosphorus content and are efficient, are preferable.

Although the amount of the surfactant (B) that is used varies depending on the specific surface area of the calcium carbonate, the resin that is used, and the amount of resin that is added, and is therefore difficult to specify unconditionally, it is usually preferable that the surfactant (B) is used in an amount of 0.03 to 10% by weight with respect to the calcium carbonate's BET specific surface area Sw/10. If the amount of the surfactant (B) that is used is less than 0.03% by weight, a sufficient dispersion effect is unlikely to be obtained, but even if the surfactant (B) is added in an amount of more than 10% by weight, the effect is unlikely to be further improved. Therefore, the amount of the surfactant (B) that is used is more preferably 0.05 to 5% by weight, and even more preferably 0.1 to 4% by weight.

Next, with respect to the surface treatment method, in a method of surface treatment using the chelating compound (A) or the surfactant (B), for example, a method, commonly called dry treatment, may be used in which the surface treatment agent is directly mixed with the powder using a mixer, such as a super mixer or a Henschel mixer, to thereby perform surface treatment, while performing heating if necessary, or, for example, a method, commonly called wet treatment, may be used in which the surface treatment agent is dissolved in water or hot water and added to an aqueous slurry of calcium carbonate under stirring, to thereby perform surface treatment, which is followed by dehydration and drying, or a combination of both may be used. However, in light of the extent to which the calcium carbonate particle surface is treated and the economic advantages, it is preferable to mainly use the wet treatment.

In order to even further improve the dispersibility of the calcium carbonate filler of the present invention in resins, various types of grinders can be used. Although there is no particular limitation on the grinders that can be used in the present invention, examples thereof include grinders that use a grinding medium in which glass, zirconia, titanium oxide, alumina, or the like is used; medium-less grinders that use a gas stream or a liquid stream instead of using a grinding medium; and the like. Moreover, for example, when coarse particles of several micrometers or larger that are present in the calcium carbonate filler at a contamination level are to be broken up, the above-described medium-type grinders are useful in grinding the calcium carbonate filler in a wet system in which the calcium carbonate filler is suspended in water or an organic solvent. On the other hand, the medium-less grinders are less likely to cause contamination, breakage of particles can be easily suppressed, and are suitable for mild dispersion.

Therefore, when the calcium carbonate filler is to be used as an antiblocking material for thin films, which is one of the purposes and uses of the present invention, the medium-less grinders, which are less likely to cause contamination than the medium-type grinders, are preferred in terms of uniform dispersion of particles.

With respect to the type of the calcium carbonate filler for resins of the present invention, either a wet type or a dry type can be selected depending on the style of packing of the end product. That is to say, if the end product is to be a powder, a dry type can be adopted, and if the end product is to be a slurry with water, ethylene glycol, or the like, a wet type can be adopted. In particular, in the case where the end product is to be a powder, there is no need to worry about the style of packing or sedimentation of the calcium carbonate filler, which is preferable in terms of versatility.

Next, the resin composition of the present invention will be described.

There is no particular limitation on the resin that is used in the present invention. In the case where use as an antiblocking material or the like is intended, although various types of resins that are processed at a low temperature may be used, resins that are processed at a relatively high temperature are useful.

Examples thereof include general purpose resins typified by acrylic resin (PMMA), polyvinyl alcohol (PVA), polyvinylidene chloride (PVDC), polybutadiene (PBD), polyethylene terephthalate (PET), and the like; engineering plastics such as polyacetal (POM), polyamide (PA), polycarbonate (PC), modified polyphenylene ether (PPE), polybutylene terephthalate (PBT), polyethylene naphthalate (PEN), ultrahigh-molecular-weight polyethylene (UHPE), polysulfone (PSF), polyethersulfone (PES), polyphenylene sulfide (PPS), polyarylate (PAR), polyetheretherketone (PEEK), polyimide (PI), polyetherimide (PEI), fluororesin (FR), liquid crystal polymer (LCP), and the like; and thermosetting resins such as phenol, urea, melamine, alkyd, unsaturated polyester, epoxy, diallyl phthalate, polyurethane, modified silicone, polysulfide, reactive acrylic resin, polyisobutylene, silylated urethane, modified epoxy, and the like. Furthermore, biodegradable plastics such as polylactic acid resin, polybutylene succinate, polyamide 11, and polyhydroxybutyrate as well as biomass plastics can also be used.

Among these, polyester-based resins having an ester bond, such as PET, PBT, PEN, PC, and LCP, are highly versatile as sheet and film products, and in particular, PET is suitable for the purposes and uses of the present invention.

The mixing ratio between the calcium carbonate filler for resins of the present invention and the resin significantly varies depending on the type and use of the resin, desired properties, and the cost, and can be appropriately determined depending on these factors, but in the case where use as an antiblocking material is intended, the amount of the calcium carbonate filler is usually 0.05 to 30 parts by weight, more preferably 0.1 to 15 parts by weight, and even more preferably 0.3 to 10 parts by weight, with respect to 100 parts by weight of the resin. If the amount of the calcium carbonate filler is more than 30 parts by weight, a decrease in the kneadability with the resin, and a decrease in the hue (whiteness) due to deterioration of the resin, are likely to occur, and if the amount of the calcium carbonate filler is less than 0.05 parts by weight, there are cases where sufficient antiblocking properties cannot be obtained.

Moreover, a lubricant, such as a fatty acid amide, an ethylenebis stearic acid amide, or a sorbitan fatty acid ester, a plasticizer and a stabilizer, an antioxidant, and the like may also be added without inhibiting the efficacy of the resin composition of the present invention, in order to improve the characteristics of the resin composition, if necessary. Furthermore, additives that are commonly used in resin compositions for films, for example, a lubricant, an antioxidant, a fluorescent brightener, a thermal stabilizer, an optical stabilizer, an ultraviolet absorber, a neutralizer, an antifogging agent, an antiblocking agent, an antistatic agent, a slip agent, a coloring agent, and the like may also be added.

In the case where the calcium carbonate filler of the present invention and various types of additives are added to the resin, mixing is performed using a known mixing machine such as a super mixer, a Henschel mixer, a tumbler mixer, or a ribbon blender. After the resin composition has been mixed in the mixing machine, the resin composition is heated and kneaded using a single- or double-screw extruder, a kneader-mixer, a Banbury mixer, or the like to once produce pellets, which are called a masterbatch and contain the various types of additives as well as the calcium carbonate filler of the present invention, and then, the pellets are melted and formed into a film through T-die extrusion or using a known molding machine for inflation molding or the like. After that, if necessary, the film may be uniaxially or biaxially stretched into a film product with a uniform micropore diameter.

Furthermore, if necessary, it is possible to arrange a plurality of sets of the steps from the beginning of the above-described process to the T-die extrusion, and produce a film with a multilayer structure during the extrusion, it is possible to introduce steps of bonding layers of film together during the stretching and then re-stretching the film to produce a multilayer film, or it is also possible to cure the film under a temperature condition that is higher than room temperature and lower than the melting temperature of the resin.

Moreover, for the purpose of imparting printability to the above-described film, the film surface may be coated with an ink receiving layer by performing surface treatment through plasma discharge or the like, or at least one side of the film may be provided with a protective layer by applying an organic solvent solution of a heat-resistant resin, such as an aromatic para-aramid, aromatic meta-aramid, polyphenylene sulfide (PPS), or polyetheretherketone (PEEK) resin, as a coating solution.

EXAMPLES

Hereinafter, the present invention will be described in greater detail using examples and comparative examples. However, it should be construed that the present invention is not limited to these examples and comparative examples.

Example 1

A calcium carbonate was synthesized through a carbonation reaction performed by supplying a furnace gas having a $CO_2$ concentration of 25% to 3 $m^3$ of milk of lime having a specific gravity of 1.070 at a flow rate of 12 $m^3$/min. The synthesized calcium carbonate aqueous slurry was subjected to particle growth by performing Ostwald ripening to a BET specific surface area of 9 $m^2$/g, and then dehydrated to a solid content of 60% by weight using a filter press. After that, sodium polyacrylate and triethyl phosphate (TEP), serving as surface treatment agents, were added to the dehydrated cake in respective amounts of 0.9% by weight with respect to the calcium carbonate solid content, to thereby prepare a high-concentration aqueous slurry having a solid content of 50% by weight or more.

Next, the aqueous slurry was ground at a flow rate of 500 ml/min using a wet grinder (a Star Burst Labo model manufactured by Sugino Machine Limited; under a grinding pressure condition of 245 MPa), and then powdered using a spray dryer to prepare a calcium carbonate filler. Table 1 shows the characteristics of the filler.

Example 2

A calcium carbonate filler was prepared in a manner similar to that of Example 1, except that the Ostwald ripening of Example 1 was performed to a BET specific surface area of 5 $m^2$/g, and the amounts of the surface treatment agents added were each changed to 0.5% by weight. Table 1 shows the characteristics of the filler.

Example 3

The ripened product of Example 2 was subjected to a carbonation reaction under stirring conditions at a pH of the system of 10.0±0.5, while further dripping milk of lime having a specific gravity of 1.070 at a flow rate of 0.1 $m^3$/hr and simultaneously letting a furnace gas having a $CO_2$ concentration of 25% flow therethrough. The total amount of dripped milk of lime was 2.5 $m^3$. Next, a calcium carbonate filler was prepared in a manner similar to that of Example 1, except that the amounts of the surface treatment agents added were each changed to 0.3% by weight. Table 1 shows the characteristics of the filler.

Example 4

A calcium carbonate filler was prepared in a manner similar to that of Example 3, except that the total amount of dripped milk of lime in Example 3 was changed to 4 $m^3$, and the amounts of the surface treatment agents added were each changed to 0.2% by weight. Table 1 shows the characteristics of the filler.

Example 5

A calcium carbonate filler was prepared in a manner similar to that of Example 3, except that the total amount of dripped milk of lime in Example 3 was changed to 10 $m^3$, and the amounts of the surface treatment agents added were each changed to 0.1% by weight. Table 1 shows the characteristics of the filler.

Example 6

A calcium carbonate filler was prepared in a manner similar to that of Example 2, except that after the high-concentration aqueous slurry having a solid content of 50% by weight or more was prepared in Example 2, the slurry was powdered through spray drying, and then grinding was performed using a dry grinder (a CGS50 model manufactured by NETZSCH; at a grinding pressure of 0.3 MPa). Table 1 shows the characteristics of the filler.

Example 7

The high-concentration aqueous slurry having a solid content of 50% by weight or more prepared in Example 2 was powdered through spray drying without passing through a grinder, to thereby prepare a calcium carbonate filler. Next, 50 kg of the filler and 50 kg of ethylene glycol were mixed and made into a slurry, and grinding was performed at a flow rate of 500 ml/min using a wet grinder (a Star Burst Labo model manufactured by Sugino Machine Limited; under a grinding condition of 245 MPa), to thereby obtain a dispersion of the calcium carbonate in ethylene glycol. Table 1 shows the characteristics of the filler.

Example 8

A calcium carbonate filler was prepared in a manner similar to that of Example 6, except that sodium polyacrylate and triethyl phosphate (TEP), which served as the surface treatment agents in Example 6, were changed to sodium hexametaphosphate and lauric acid, respectively. Table 1 shows the characteristics of the filler.

Example 9

A calcium carbonate filler was prepared in a manner similar to that of Example 6, except that triethyl phosphate (TEP), which served as the surface treatment agent in Example 6, was changed to N-phenyl-3-aminopropyltrimethoxysilane (silane coupling agent). Table 1 shows the characteristics of the filler.

Example 10

A calcium carbonate filler was prepared in a manner similar to that of Example 6, except that triethyl phosphate (TEP), which served as the surface treatment agent in Example 6, was changed to trimethyl phosphate (TMP). Table 1 shows the characteristics of the filler.

Example 11

A calcium carbonate filler was prepared in a manner similar to that of Example 6, except that the surface treatment agents used in Example 6 were changed to sodium polyacrylate alone. Table 1 shows the characteristics of the filler.

Example 12

A calcium carbonate filler was prepared in a manner similar to that of Example 9, except that the surface treatment agents used in Example 9 were changed to trimethyl phosphate (TMP) alone. Table 1 shows the characteristics of the filler.

Example 13

A calcium carbonate filler was prepared in a manner similar to that of Example 6, except that the surface treatment agents of Example 6 were not added. Table 1 shows the characteristics of the filler.

Comparative Example 1

Milk of lime and carbon dioxide gas were subjected to a carbonation reaction and combined through dripping in a manner similar to that of Example 3 of Japanese Laid-Open Patent Publication No. S64-4240, to thereby produce a calcium carbonate material slurry having a BET specific surface area of 4.86 $m^2/g$.

The synthesized calcium carbonate aqueous slurry was dehydrated using a filter press. The obtained press cake (having a solid content of 60% by weight) was placed in a treatment bath equipped with a thermostat, and strongly stirred while sodium polyacrylate serving as a surface treatment agent was added in an amount of 1.0% by weight in terms of pure content with respect to the calcium carbonate solid content, and thus, a high-concentration aqueous slurry was prepared.

The aqueous slurry was powdered using a spray dryer to prepare a calcium carbonate filler. Next, 50 kg of the filler and 50 kg of ethylene glycol were fed and stirred to prepare an ethylene glycol slurry, which was a raw material to be wet-ground.

Next, the ethylene glycol slurry was ground at a flow rate of 250 ml/min using a wet grinder (a DYNO-MILL Pilot model manufactured by WAB; under grinding conditions with glass beads having a diameter of 0.6 to 0.9 mm being used as a medium, at a medium filling rate of 80%, and at a rotation rate of 1,500 rpm), and thus an ethylene glycol dispersion was prepared. Table 1 shows the characteristics of the filler.

Comparative Example 2

As described in Example 8 of JP H7-196316A, 100 L each of a sodium carbonate solution having a concentration of 1.0 mol/L, a calcium chloride solution having a concentration of 0.6 mol/L, and a 0.03 mol/L sodium hydroxide solution (reaction buffer) was prepared. The sodium hydroxide solution and the sodium carbonate solution were mixed to prepare a mixed solution, and the temperatures of the mixed solution and the sodium chloride solution were both adjusted to 17° C. Next, 100 L of the sodium chloride solution was dripped into 200 L of the mixed solution of the sodium hydroxide solution and the sodium carbonate solution, and a carbonation reaction was caused under stirring conditions. The supply through dripping was ended after 270 seconds from the start of dripping. After 180 seconds from the end of dripping, sodium hexametaphosphate was added thereto in an amount corresponding to 0.3% by weight of the theoretical production amount of calcium carbonate that was present in the reaction system, and stirring was further performed for 5 minutes. The aqueous slurry of calcium carbonate that was prepared in the above-described manner was washed with distilled water using a centrifugal dryer until the electrical conductivity of the dehydrated filtrate became 30 µS/cm. To the dehydrated cake (having a solid content of 60% by weight) were added sodium polyacrylate and triethyl phosphate (TEP) serving as surface treatment agents in respective amounts of 1.0% by weight in terms of pure content with respect to the calcium carbonate solid content, and thus a high-concentration aqueous slurry having a solid content of 50% by weight or more was prepared. Then, the aqueous slurry was dried and powdered using a spray dryer to prepare a calcium carbonate filler. Table 1 shows the characteristics of the filler.

Comparative Example 3

As described in Example 7 of JPH5-117443A, a mixed slurry of methanol having a quicklime concentration of 3.0% by weight and water was adjusted to a temperature of 42° C., and then a carbonation reaction was carried out until a conductivity of 100 µS/cm was reached, while letting carbon dioxide gas with a purity of 99% or more flow at a flow rate of 0.082 mol/min.

To the obtained mixed slurry of calcium carbonate methanol and water was added a predetermined amount of ethylene glycol, without adding a surface treatment. Then, methanol and water were removed through flushing using a rotary evaporator, to thereby prepare an ethylene glycol dispersion with a concentration of 20% by weight. Table 1 shows the characteristics of the filler.

Comparative Example 4

To a ground and classified heavy calcium carbonate (manufactured by Maruo Calcium Co., Ltd.; trade name: CALTEX 7) powder were added sodium polyacrylate serving as a surface treatment agent in an amount of 1.0% by weight in terms of pure content with respect to the calcium carbonate solid content, and water, and thus a calcium carbonate slurry having a concentration of 50% by weight was prepared. The calcium carbonate slurry was dried and powdered using a spray dryer to prepare a calcium carbonate filler. Table 1 shows the characteristics of the filler.

| | | Examples | | | | | | | |
|---|---|---|---|---|---|---|---|---|---|
| Items | | 1 | 2 | 3 | 4 | 5 | 6 | 7 | 8 |
| (a) Sw ($m^2/g$) | | 9.3 | 5.2 | 3.5 | 2.0 | 1.3 | 5.2 | 5.2 | 5.2 |
| (b) Dx (µm) | | 0.24 | 0.43 | 0.63 | 1.12 | 1.71 | 0.43 | 0.43 | 0.43 |
| (c) Dy (µm) | | 0.40 | 0.64 | 1.05 | 1.98 | 4.05 | 0.58 | 0.63 | 0.63 |
| (d) Dy/Dx | | 1.67 | 1.50 | 1.65 | 1.76 | 2.37 | 1.36 | 1.47 | 1.48 |
| (e) Tw (wt %) | | 0.42 | 0.34 | 0.32 | 0.30 | 0.27 | 0.34 | 0.34 | 0.33 |

-continued

| Surface Treatment Agents | | | | | | | | |
|---|---|---|---|---|---|---|---|---|
| (A) Chelete Compound | PA-Na | PA-Na | PA-Na | PA-Na | PA-Na | PA-Na | PA-Na | HMP-Na |
| (wt %) | 0.9 | 0.5 | 0.3 | 0.2 | 0.1 | 0.5 | 0.5 | 0.5 |
| (B) Suractant | TEP | TEP | TEP | TEP | TEP | TEP | TEP | LA |
| (wt %) | 0.9 | 0.5 | 0.3 | 0.2 | 0.1 | 0.5 | 0.5 | 0.5 |

| | Examples | | | | | Comparative Examples | | | |
|---|---|---|---|---|---|---|---|---|---|
| Items | 9 | 10 | 11 | 12 | 13 | 1 | 2 | 3 | 4 |
| (a) Sw (m²/g) | 5.2 | 5.2 | 5.2 | 5.2 | 5.2 | 13.2 | 0.9 | 10.0 | 8.2 |
| (b) Dx (μm) | 0.43 | 0.43 | 0.43 | 0.43 | 0.43 | 0.17 | 2.36 | 0.22 | 0.27 |
| (c) Dy (μm) | 0.66 | 0.61 | 0.61 | 0.65 | 0.71 | 0.39 | 4.53 | 0.44 | 0.96 |
| (d) Dy/Dx | 1.54 | 1.43 | 1.43 | 1.52 | 1.66 | 2.31 | 1.92 | 1.98 | 3.54 |
| (e) Tw (wt %) | 0.31 | 0.32 | 0.33 | 0.28 | 0.24 | 0.53 | 0.82 | 0.86 | 0.23 |
| Surface Treatment Agents | | | | | | | | | |
| (A) Chelete Compound | PA-Na | PA-Na | PA-Na | — | — | PA-Na | PA-Na | — | PA-Na |
| (wt %) | 0.5 | 0.5 | 0.5 | — | — | 1.0 | 1.0 | — | 1.0 |
| (B) Suractant | SC | TMP | — | TMP | — | — | TEP | — | — |
| (wt %) | 0.5 | 0.5 | — | 0.5 | — | — | 1.0 | — | — |

PA-Na: Sodium Polyacrylate
HMP-Na: Sodium Hexametaphosphate
ST-K: Potassium Stearate
LA; Lauric Acid
SC: Silane Coupling Agent
TEP: Triethyl Phosphate Application 1 (Polyester Resin Film)

Applied Examples 1 to 12 and Applied Comparative Examples 1 to 4

Polyester resin films were prepared using the ethylene glycol dispersions of Example 7 and Comparative Examples 1 and 3 based on the following mixing ratios.

Table 2 shows the evaluation results with respect to the obtained polyester resin films.

(Mixing Example 1)
Production of Filler-Containing Polyester Master Pellets A and Non-Filler-Containing Polyester Homo-Pellets B Master pellets A were prepared using the ethylene glycol dispersions of Example 7 and Comparative Examples 1 and 3 based on the following procedures.

To dimethyl terephthalate (DMT) were added ethylene glycol in an amount of 1.9 mol with respect to 1 mol of DMT, magnesium acetate tetrahydrate in an amount of 0.05 parts by weight with respect to 100 parts by weight of DMT, and phosphoric acid in an amount of 0.015 parts by weight. After heated ester exchange was performed, each of the ethylene glycol dispersions of Example 7 and Comparative Examples 1 and 3 was added as a calcium carbonate filler in an amount of 0.5 parts by weight with respect to DMT. Subsequently, antimony trioxide was added in an amount of 0.025 parts by weight with respect to DMT. Then, the temperature was increased through heating, and a polycondensation reaction was caused under vacuum, to thereby obtain filler-containing polyester master pellets A with an intrinsic viscosity of 0.62 dl/g.

Next, non-filler-containing polyester homo-pellets B with an intrinsic viscosity of 0.62 dl/g were obtained in exactly the same manner as described above, except that no ethylene glycol dispersions were contained.

(Mixing Example 2)
Production of Filler-Containing Polyester Master Pellets C
Filler-containing polyester master pellets C were prepared using the calcium carbonate fillers of Examples 1 to 6 and 9 to 13 as well as Comparative Examples 2 and 4 based on the following procedures.

First, 0.5 parts by weight of each of the calcium carbonate fillers of Examples 1 to 6 and 9 to 13 as well as Comparative Examples 2 and 4 and 99.5 parts by weight of the above-described non-filler-containing polyester homo-pellets B with an intrinsic viscosity of 0.62 dl/g were mixed using a super mixer, then supplied to a vented extruder having twin screws with a diameter of 30 mm, and melted at a temperature of 290° C. The melted mixture was filtered by being passed through a filter made of metal fibers and having a 95% cutting pore diameter of 10 μm, and then extruded from a die having a pore diameter of 2 mm to obtain a gut-shaped resin composition. Furthermore, the composition was cut into pieces of a length of about 3 mm to obtain filler-containing polyester master pellets C containing the calcium carbonate filler in an amount of 0.5% by weight and having an intrinsic viscosity of 0.62 dl/g.

(Film Formation Example)
The filler-containing polyester master pellets A and the non-filler-containing polyester homo-pellets B, with respect to each of Application Example 7 and Applied Comparative Examples 1 and 3, or the filler-containing polyester master pellets C and the non-filler-containing polyester homo-pellets B, with respect to each of Applied Examples 1 to 6 and 8 to 12 as well as Applied Comparative Examples 2 and 4, were separately dried under reduced pressure at 160° C. for 8 hours, then supplied to separate extruders, subjected to melt extrusion at 275° C. and high-precision filtration, and then joined together and laminated in a rectangular, triple-layer joining block to form a triple-layer laminate consisting of a polyester layer A, a polyester layer B, and a polyester layer A, or a polyester layer C, a polyester layer B, and a polyester layer C. After that, the triple-layer laminate was extruded onto a cooling roller via a slit die that was kept at 285° C., wrapped around a casting drum having a surface temperature of 25° C. using an electrostatic casting method, and cooled and solidified, to thereby obtain an unstretched laminate film.

This unstretched laminate film was stretched 3.8 times larger in a longitudinal direction, subsequently stretched 3.9 times larger in a lateral direction in hot air at 110° C. using a stenter, and heat-treated at 230° C. using the stenter, to thereby obtain a biaxially oriented polyester resin film (triple-layer) having a thickness of 23 μm (the polyester layers A or C had a thickness of 1.5 μm, and the polyester layer B had a thickness of 20 μm).

As shown in the table below, the polyester resin films of the examples had highly smooth surfaces, less defects, and excellent slitting properties, and were useful as mold release films for a thin ceramic sheet or the like.

Evaluations of Polyester Resin Films (1) Antiblocking Properties

Polyester resin films were laid one on top of another, and held under a load of 100 kg/cm$^2$ at 100° C. for one day.

In conformity with JIS-K 6732, the peel strength was obtained under conditions at a tensile strength of 200 mN/min using a tensile strength measuring device (STRO-GRAPH VE1D manufactured by Toyo Seiki Seisaku-sho, Ltd.), and evaluated based on the following criteria.

Good: The peel strength was less than 200 mN/10 cm in width.

Fair: The peel strength was 200 mN/10 cm in width or more, and less than 400 mN/10 cm in width.

Poor: The peel strength was 400 mN/10 cm in width or more.

(2) Surface Roughness (SRa, SRz)

In order to confirm the smoothness of a polyester resin film, measurement was performed using a three-dimensional surface roughness measuring device (ET-359K manufactured by Kosaka Laboratory Ltd.). Based on the obtained surface profile curve, the value of arithmetic mean roughness SRa and the value of ten-point average surface roughness SRz were obtained in conformity with JIS-B O601, and evaluated based on the following criteria.

Good: SRa was less than 50 nm, and SRz was less than 500 nm.

Fair: SRa was 50 nm or more, and less than 100 nm, and SRz was less than 500 nm.

Poor: SRa was 100 nm or more, and SRz was 500 nm or more.

(3) Number of Coarse Protrusions

Two polyester resin films having a size of 10 cm square were laid one on top of the other with their surfaces to be measured facing each other, and adhered to each other using an electrostatic force while applying a voltage. Then, the height of a coarse protrusion on the film surface was measured based on interference fringes produced by the coarse protrusion. The number of coarse protrusions (protrusions/cm$^2$) where the interference fringes had a single ring of 0.270 μm or more, a double ring of 0.540 μm or more, or a triple ring of 0.810 μm or more were measured and evaluated based on the following criteria.

Note that a halogen lamp with a band-pulse filter of 564 nm was used as the light source.

Good: The number of coarse protrusions was less than 5 (protrusions/cm$^2$).

Fair: The number of coarse protrusions was 5 or 6 (protrusions/cm$^2$).

Poor: The number of coarse protrusions was 7 (protrusions/cm$^2$) or more.

(4) Pinhole in Ceramic Sheet

A solvent (toluene), a ceramic raw material (BaTiO$_3$ manufactured by Sakai Chemical Industry Co., Ltd.), a binder (ethyl cellulose), a plasticizer (dioctyl phthalate), and the like were mixed and made into a paste, which was then dispersed using a ball mill, to thereby obtain a ceramic slurry.

Next, a surface of a polyester resin film was coated using a doctor blade method so that the thickness of the above-described ceramic was 1 μm when dried, followed by drying in an oven at an ambient temperature of 100° C. for 5 minutes, and thus, a ceramic sheet was obtained. A portion having an area of 10 cm$^2$ on this sheet was exposed to light from the opposite side of the sheet, and the state of occurrence of a pinhole was visually observed, and evaluated based on the following criteria.

Good: No pinhole was observed.

Fair: Only a few pinholes were observed.

Poor: A large number of pinholes were observed.

TABLE 2

| Applied Examples or Applied Comparative Examples | Used Calsium Carbonate Fillers | Polyester Resin Films | | | | |
|---|---|---|---|---|---|---|
| | | Triple-Layer Laminate | Antiblocking Properties | Surface Roughness | Number of Coarse Protrusions | Pinhole |
| Applied Example 1 | Example 1 | C/B/C | Fair | Good | Good | Good |
| Applied Example 2 | Example 2 | C/B/C | Good | Good | Good | Good |
| Applied Example 3 | Example 3 | C/B/C | Good | Good | Good | Good |
| Applied Example 4 | Example 4 | C/B/C | Good | Fair | Fair | Good |
| Applied Example 5 | Example 5 | C/B/C | Fair | Fair | Fair | Good |
| Applied Example 6 | Example 6 | C/B/C | Good | Good | Good | Good |
| Applied Example 7 | Example 7 | A/B/A | Good | Good | Good | Good |
| Applied Example 8 | Example 9 | C/B/C | Good | Good | Good | Good |
| Applied Example 9 | Example 10 | C/B/C | Good | Good | Good | Good |
| Applied Example 10 | Example 11 | C/B/C | Good | Good | Good | Fair |
| Applied Example 11 | Example 12 | C/B/C | Good | Fair | Good | Good |
| Applied Example 12 | Example 13 | C/B/C | Good | Fair | Fair | Fair |
| Applied Comparative Example 1 | Comparative Example 1 | A/B/A | Poor | Fair | Fair | Poor |
| Applied Comparative Example 2 | Comparative Example 2 | C/B/C | Fair | Poor | Fair | Fair |
| Applied Comparative Example 3 | Comparative Example 3 | A/B/A | Good | Good | Good | Poor |
| Applied Comparative Example 4 | Comparative Example 4 | C/B/C | Poor | Poor | Poor | Poor |

From the results shown in Table 2, it was found that when the calcium carbonate fillers of Examples 1 to 7 and 9 to 13 were used as antiblocking materials in polyester resin films, the films exhibited high smoothness and peelability, and therefore, the calcium carbonate fillers are useful for use in a release film for various types of mold release materials, an electrical insulating film, and the like.

Application 2 (PPS Resin Film)

Applied Examples 13 to 24 and Applied Comparative Examples 5 and 6

PPS resin films were prepared using the calcium carbonate fillers of Examples 1 to 7 and 9 to 13 as well as Comparative Examples 2 and 4 based on the following mixing ratios. Table 3 shows the evaluation results with respect to the obtained PPS resin films.

(Mixing Example)
Production of Filler-Containing PPS Master Pellets A and Non-Filler-Containing PPS Homo-Pellets B Each of the calcium carbonate fillers of Examples 1 to 7 and 9 to 13 as well as Comparative Examples 2 and 4 was mixed with PPS resin pellets using a super mixer so that the calcium carbonate filler was contained in the mixture in an amount of 0.5% by weight. The obtained mixture was supplied to a vented extruder having twin screws with a diameter of 30 mm, and melted at a temperature of 320° C. The melted mixture was filtered by being passed through a filter made of metal fibers and having a 95% cutting pore diameter of 10 μm, and then extruded from a die having a pore diameter of 2 mm, to obtain a gut-shaped resin composition. Furthermore, the composition was cut into pieces of a length of about 3 mm to obtain filler-containing PPS master pellets A containing the calcium carbonate filler in an amount of 0.5% by weight.

Non-filler-containing PPS homo-pellets B were obtained in a manner similar to that described above, except that the above-described calcium carbonate filler was not contained.

Next, the filler-containing PPS master pellets A and the non-filler-containing PPS homo-pellets B were separately dried under reduced pressure at 160° C. for 8 hours, then supplied to separate extruders, subjected to melt extrusion at 310° C. and high-precision filtration, and then joined together and laminated in a rectangular, triple-layer joining block to form a triple-layer laminate consisting of a PPS layer A, a PPS layer B, and a PPS layer A. After that, the triple-layer laminate was extruded onto a cooling roller via a slit die that was kept at 320° C., wrapped around a casting drum having a surface temperature of 25° C. using an electrostatic casting method, and cooled and solidified, to thereby obtain an unstretched laminate film.

This unstretched laminate film was stretched 3.3 times larger in the longitudinal direction, subsequently stretched 3.6 times larger in the lateral direction in hot air at 110° C. using a stenter, and heat-treated at 240° C. using the stenter, to thereby obtain a biaxially oriented PPS resin film (triple-layer) having a thickness of 23 μm (the PPS layers A had a thickness of 1.5 μm, and the PPS layer B had a thickness of 20 μm).

(Evaluations of PPS Resin Films)
(1) Antiblocking Properties

PPS resin films were laid one on top of another, and held under a load of 100 kg/cm$^2$ at 60° C. for one day.

In conformity with JIS-K 6732, the peel strength was obtained under conditions at a tensile strength of 200 mN/min using a tensile strength measuring device (STROGRAPH VE1D manufactured by Toyo Seiki Seisaku-sho, Ltd.), and evaluated based on the following criteria.

Good: The peel strength was less than 200 mN/10 cm in width.

Fair: The peel strength was 200 mN/10 cm in width or more, and less than 400 mN/10 cm in width.

Poor: The peel strength was 400 mN/10 cm in width or more.

(2) Surface Roughness (SRa, SRz)

In order to confirm the smoothness of a PPS resin film, measurement was performed using a three-dimensional surface roughness measuring device (ET-359K manufactured by Kosaka Laboratory Ltd.). Based on the obtained surface profile curve, the value of arithmetic mean roughness SRa and the value of ten-point average surface roughness SRz were obtained in conformity with JIS-B O601, and evaluated based on the following criteria.

Good: SRa was less than 50 nm, and SRz was less than 500 nm.

Fair: SRa was 50 nm or more, and less than 100 nm, and SRz was less than 500 nm.

Poor: SRa was 100 nm or more, and SRz was 500 nm or more.

(3) Number of Coarse Protrusions

Two PPS resin films having a size of 10 cm square were laid one on top of the other with their surfaces to be measured facing each other, and adhered to each other using an electrostatic force while applying a voltage. Then, the height of a coarse protrusion on the film surface was measured based on interference fringes produced by the coarse protrusion. The number of coarse protrusions (protrusions/cm$^2$) where the interference fringes had a single ring of 0.270 μm or more, a double ring of 0.540 μm or more, or a triple ring of 0.810 μm or more were measured and evaluated based on the following criteria.

Note that a halogen lamp with a band-pulse filter of 564 nm was used as the light source.

Good: The number of coarse protrusions was less than 5 (protrusions/cm$^2$).

Fair: The number of coarse protrusions was 5 or 6 (protrusions/cm$^2$).

Poor: The number of coarse protrusions was 7 (protrusions/cm$^2$) or more.

(4) Pinhole in Ceramic Sheet

A solvent (toluene), a ceramic raw material (BaTiO$_3$ manufactured by Sakai Chemical Industry Co., Ltd.), a binder (ethyl cellulose), a plasticizer (dioctyl phthalate), and the like were mixed and made into a paste, which was then dispersed using a ball mill, to thereby obtain a ceramic slurry.

Next, a surface of a PPS resin film was coated using a doctor blade method so that the thickness of the above-described ceramic was 1 μm when dried, followed by drying in an oven at an ambient temperature of 100° C. for 5 minutes, and thus, a ceramic sheet was obtained. A portion having an area of 10 cm$^2$ on this sheet was exposed to light from the opposite side of the sheet, and the state of occurrence of a pinhole was visually observed, and evaluated based on the following criteria.

Good: No pinhole was observed.

Fair: Only a few pinholes were observed.

Poor: A large number of pinholes were observed.

TABLE 3

| Applied Examples or Applied Comparative Examples | Used Calcium Carbonate Fillers | PPS Resin Films | | | | |
|---|---|---|---|---|---|---|
| | | Triple-Layer Laminate | Antiblocking Properties | Surface Roughness | Number of Coarse Protrusions | Pinhole |
| Applied Example 13 | Example 1 | A/B/A | Fair | Good | Good | Fair |
| Applied Example 14 | Example 2 | A/B/A | Good | Good | Good | Good |
| Applied Example 15 | Example 3 | A/B/A | Good | Good | Good | Good |
| Applied Example 16 | Example 4 | A/B/A | Fair | Fair | Fair | Good |
| Applied Example 17 | Example 5 | A/B/A | Fair | Fair | Fair | Good |
| Applied Example 18 | Example 6 | A/B/A | Good | Good | Good | Good |
| Applied Example 19 | Example 7 | A/B/A | Good | Good | Good | Good |
| Applied Example 20 | Example 9 | A/B/A | Good | Good | Good | Good |
| Applied Example 21 | Example 10 | A/B/A | Good | Good | Good | Good |
| Applied Example 22 | Example 11 | A/B/A | Good | Good | Good | Fair |
| Applied Example 23 | Example 12 | A/B/A | Good | Fair | Good | Fair |
| Applied Example 24 | Example 13 | A/B/A | Good | Fair | Fair | Fair |
| Applied Comparative Example 5 | Comparative Example 2 | A/B/A | Fair | Poor | Fair | Fair |
| Applied Comparative Example 6 | Comparative Example 4 | A/B/A | Poor | Poor | Poor | Poor |

From the results shown in Table 3, it was found that when the calcium carbonate fillers of Examples 1 to 7 and 9 to 13 were used as antiblocking materials in PPS resin films, the films exhibited high smoothness and peelability, and therefore, the calcium carbonate fillers are useful for use in a release film for various types of mold release materials, an electrical insulating film, and the like.

Application 3 (Polypropylene-Based Resin Film)

Applied Examples 25 to 28 and Applied Comparative Examples 7 and 8

Polypropylene-based resin films were prepared using the calcium carbonate fillers of Examples 3 to 5 and 8 as well as Comparative Examples 2 and 4 based on the following mixing ratios. Table 4 shows the evaluation results with respect to the obtained polypropylene-based resin films.

Production of Polypropylene-Based Master Pellets A for Inner Layer and Polypropylene-Based Homo-Pellets B for Outer Layer Each of the calcium carbonate fillers of Examples 3 to 5 and 8 as well as Comparative Examples 2 and 4 was mixed with a mixture of a propylene-ethylene random copolymer and an ethylene-hexene-1 copolymer in a weight ratio of 60/40 using a super mixer so that the calcium carbonate filler was contained in the resulting mixture in an amount of 0.5% by weight. The obtained mixture was supplied to a vented extruder having twin screws with a diameter of 30 mm, and melted at a temperature of 170° C. The melted mixture was filtered by being passed through a filter made of metal fibers and having a 95% cutting pore diameter of 10 μm, and then extruded from a die having a pore diameter of 2 mm, to obtain a gut-shaped resin composition. Furthermore, the composition was cut into pieces of a length of about 3 mm to obtain filler-containing polypropylene-based master pellets A for an inner layer in which calcium carbonate particles were contained in an amount of 0.5% by weight.

Moreover, non-filler-containing polypropylene-based pellets B for an outer layer were obtained, which were composed of a propylene-ethylene block copolymer and in which the above-described calcium carbonate filler was not contained.

Next, the filler-containing polypropylene-based master pellets A for an inner layer and the non-filler-containing polypropylene-based pellets B for an outer layer were separately dried under reduced pressure at 60° C. for 8 hours, then supplied to separate extruders, subjected to melt extrusion at 200° C. and high-precision filtration, and then joined together and laminated in a rectangular, double-layer joining block, to thereby form a double-layer laminate consisting of a polypropylene-based inner layer A and a polypropylene-based outer layer B.

After that, the double-layer laminate was extruded onto a cooling roller via a slit die that was kept at 200° C., wrapped around a casting drum having a surface temperature of 25° C. using an electrostatic casting method, and cooled and solidified, to thereby obtain an unstretched laminate film.

This unstretched laminate film was stretched 5.0 times larger in the longitudinal direction, subsequently stretched 10 times larger in the lateral direction in hot air at 110° C. using a stenter, and heat-treated at 140° C. using the stenter, to thereby obtain a biaxially oriented polypropylene resin film (double-layer) having a thickness of 30 μm (the polyprepylene-based inner layer A had a thickness of 9 μm, and the polypropylene-based outer layer B had a thickness of 21 μm).

(Evaluations of Polypropylene-Based Resin Films)

(1) Antiblocking Properties

Polypropylene-based resin films were laid one on top of another, and held under a load of 50 kg/cm$^2$ at 60 days for one day. In conformity with JIS-K 6732, the peel strength was obtained under conditions at a tensile strength of 200 mN/min using a tensile strength measuring device (STROGRAPH VE1D manufactured by Toyo Seiki Seisaku-sho, Ltd.), and evaluated based on the following criteria.

Good: The peel strength was less than 200 mN/10 cm in width.

Fair: The peel strength was 200 mN/10 cm in width or more, and less than 400 mN/10 cm in width.

Poor: The peel strength was 400 mN/10 cm in width or more.

(2) Fusion Bonding to Seal Bar

During heat sealing for measurement of the heat seal strength, a seal bar was observed to visually observe whether or not fusion bonding to the seal bar occurred, and evaluations were made based on the following criteria.

Good: Fusion bonding to the seal bar was not observed.

Fair: Fusion bonding to the seal bar was observed at only a few positions.

Poor: Fusion bonding to the seal bar was observed at many positions.

(3) Re-Sealability of Heat-Sealed Portion

Heat sealing was performed at 85° C. using a similar method to heat sealing for the measurement of the heat seal strength. Then, both end portions of the two films were pulled in opposite directions in order to peel the two films from each other, and evaluations were made based on the following criteria.

Good: Films could be peeled off from each other without causing damage and could be heat-sealed again.

Fair: Films could be peeled off from each other without causing damage and could be heat-sealed again, but heat seal marks were left.

Poor: When films were peeled off from each other, the films were easily damaged, and could not be heat-sealed again.

TABLE 4

| Applied Examples or Applied Comparative Examples | Used Calcium Carbonate Fillers | Polypropylene-Based Resin Films | | | |
|---|---|---|---|---|---|
| | | Double-Layer Laminate | Antiblocking Properties | Fusion Bonding to Seal Bar | Re-sealability of Heat-Sealed Portion |
| Applied Example 25 | Example 3 | A/B | Good | Good | Good |
| Applied Example 26 | Example 4 | A/B | Good | Good | Good |
| Applied Example 27 | Example 5 | A/B | Fair | Fair | Fair |
| Applied Example 28 | Example 8 | A/B | Good | Good | Fair |
| Applied Comparative Example 7 | Comparative Example 2 | A/B | Fair | Poor | Poor |
| Applied Comparative Example 8 | Comparative Example 4 | A/B | Poor | Fair | Fair |

From the results shown in Table 4, it was found that when the calcium carbonate fillers of Examples 3 to 5 and 8 of the present application were used as antiblocking materials in polypropylene-based resin films, the films exhibited high smoothness and peelability, and therefore, the calcium carbonate fillers are useful for use in a heat sealing film for various types of packaging materials, and the like.

INDUSTRIAL APPLICABILITY

The calcium carbonate filler for resins of the present invention is useful as an antiblocking material that has excellent smoothness, peelability, and resistance to detachment for use in resin films in which the calcium carbonate filler is added to, for example, general purpose plastics, such as polyethylene and polypropylene; polyesters, such as polyethylene terephthalate (PET); engineering plastics that are processed at high temperatures, such as polyphenylene sulfide (PPS); and the like, and not to mention for use in conventional sealants, flooring, and adhesives to which the calcium carbonate filler is added at high concentrations.

What is claimed is:

1. A calcium carbonate filler for resins comprising ground particles prepared from synthetic calcium carbonate particles on the surfaces of which a coating layer composed of a surface treatment agent is formed, which satisfies the formulae (a) to (e) below:

$1.0 \leq Sw \leq 12.0$ (m$^2$/g); (a)

$0.1 \leq Dx \leq 5.0$ (μm); (b)

$0.1 \leq Dy \leq 5.0$ (μm); (c)

$0.8 \leq Dy/Dx \leq 3.5$; and (d)

$0.1 \leq Tw \leq 0.8$ (% by weight), (e)

where

Sw is a BET specific surface area (m$^2$/g) as measured using a BET specific surface area measuring apparatus;

Dx is a primary particle diameter (μm) calculated based on the BET specific surface area Sw and expressed as a calculation formula: $Dx=6/(2.7 \cdot Sw)$;

Dy is a 50% diameter (μm) when particles are arranged in ascending order of volume in a cumulative particle size volume distribution that is actually measured using a laser diffraction particle size distribution measuring apparatus; and Tw is a thermal weight loss (% by weight) between 100 and 300° C. as measured using a differential thermal analysis balance apparatus.

2. The calcium carbonate filler for resins of claim 1, wherein the surface treatment agent is a compound having the ability to chelate alkaline-earth metals, a surfactant, or a combination thereof.

3. A resin composition comprising:
a resin; and
the calcium carbonate filler for resins of claim 1.

4. The resin composition of claim 3, wherein the resin is a film-forming synthetic resin.

5. The resin composition of claim 4, wherein the film-forming synthetic resin is selected from polyester, polyphenylene sulfide, and polyolefin.

6. The resin composition of claim 4, wherein the calcium carbonate filler for resins is for use as an antiblocking material.

* * * * *